US008771431B2

(12) United States Patent
Kaipainen

(10) Patent No.: US 8,771,431 B2
(45) Date of Patent: Jul. 8, 2014

(54) ROBOTIC WASH MONITOR SYSTEM

(75) Inventor: Pasi Kaipainen, Ann Arbor, MI (US)

(73) Assignee: Interclean Equipment, Inc., Ypsilanti, MI (US)

(*) Notice: Subject to any disclaimer, the term of this patent is extended or adjusted under 35 U.S.C. 154(b) by 498 days.

(21) Appl. No.: 12/626,971

(22) Filed: Nov. 30, 2009

(65) Prior Publication Data

US 2011/0126857 A1     Jun. 2, 2011

(51) Int. Cl.
*B08B 3/00*  (2006.01)
(52) U.S. Cl.
USPC .................. 134/56 R; 134/113; 134/123
(58) Field of Classification Search
USPC ........................ 134/56 R, 113, 123
See application file for complete search history.

(56) References Cited

U.S. PATENT DOCUMENTS

| | | | | |
|---|---|---|---|---|
| 3,835,498 | A | * | 9/1974 | Arato .............................. 15/53.2 |
| 4,856,543 | A | | 8/1989 | Petit |
| 5,104,068 | A | * | 4/1992 | Krilla et al. ................ 244/134 R |
| 5,273,059 | A | * | 12/1993 | Gross et al. ................... 134/57 R |
| 5,318,254 | A | * | 6/1994 | Shaw et al. ................. 244/134 C |
| 5,454,533 | A | * | 10/1995 | Grant et al. ................ 244/134 R |
| 5,858,111 | A | * | 1/1999 | Marrero ............................ 134/6 |
| 7,846,260 | B2 | * | 12/2010 | Jiang et al. ....................... 134/18 |

| | | | |
|---|---|---|---|
| 2008/0229531 | A1 | 9/2008 | Takida |
| 2008/0250585 | A1 | 10/2008 | Auer et al. |
| 2009/0211605 | A1 | 8/2009 | Ahmad |

FOREIGN PATENT DOCUMENTS

| | | |
|---|---|---|
| EP | 0 628 477 A1 | 12/1994 |
| EP | 1 806 265 A1 | 7/2007 |
| JP | 2004-358451 A | 12/2004 |

OTHER PUBLICATIONS

European Patent Office 0 489 979 Jun. 1992.*
International Search Report of PCT/US2010/058191, Mailed on Jul. 29, 2011, 3 pages.
European Search Report of Corresponding Application No. EP 10 83 4009, Mailed Aug. 13, 2013, 3 pages.

* cited by examiner

*Primary Examiner* — Jason Ko
(74) *Attorney, Agent, or Firm* — Brinks Gilson & Lione

(57) ABSTRACT

A vehicle wash system having a wash bay including a plurality of pivotable robotic wash monitors disposed therein. The system includes measuring devices that calculate the distance between the robotic wash monitors and a vehicle in the wash bay. A master control unit is provided for programming the plurality of robotic wash monitors to clean the vehicle in accordance with an optimal set of cleaning instructions. The master control unit generates the optimal set of cleaning instructions based on three-dimensional (3D) data associated with the wash bay, 3D data associated with the vehicle, and the location of the vehicle.

10 Claims, 3 Drawing Sheets

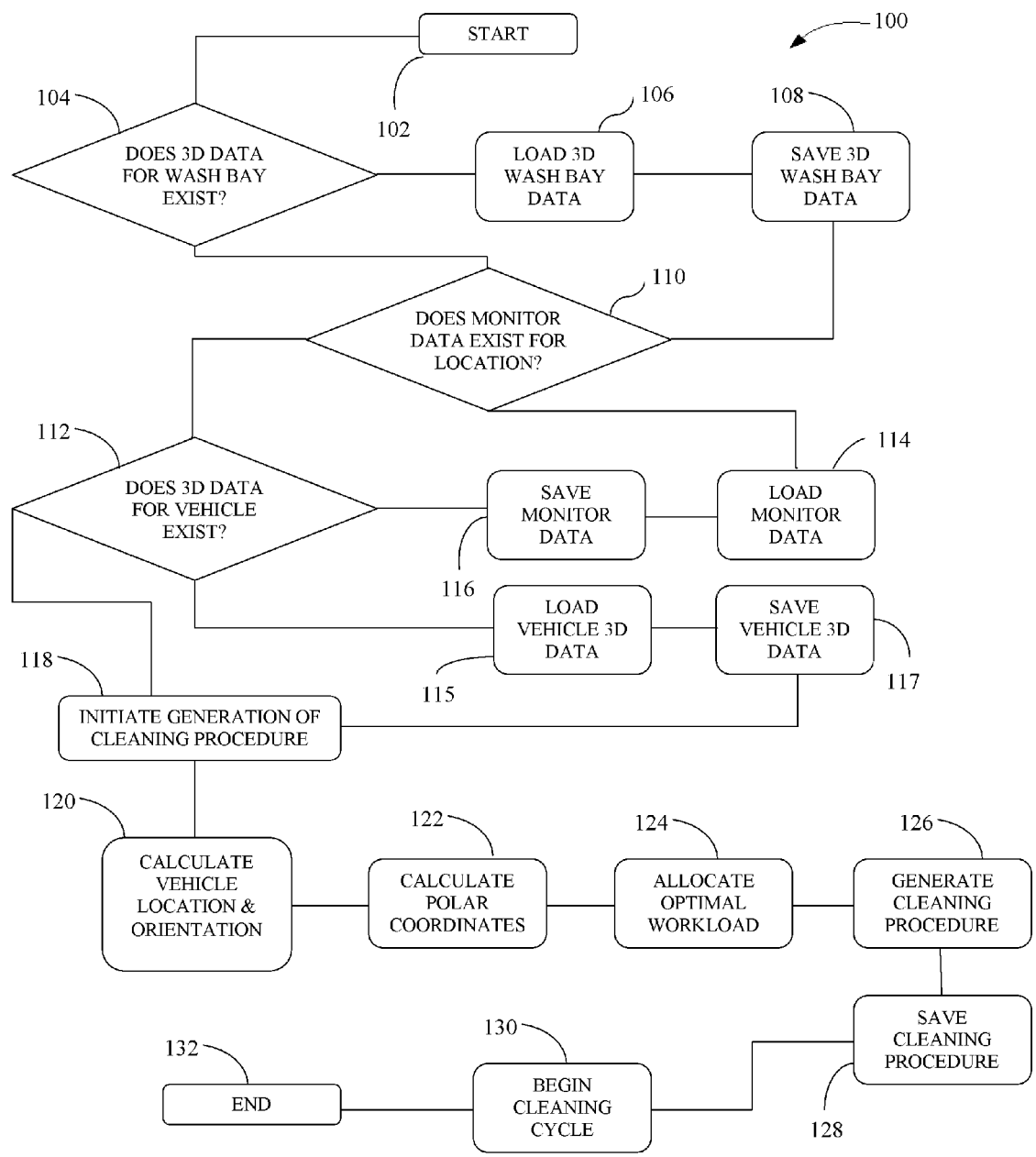

ly, the master control unit
ROBOTIC WASH MONITOR SYSTEM

FIELD OF THE INVENTION

The present invention relates to vehicle wash systems. More specifically, the present invention relates to a robotic wash monitor system for large vehicles.

BACKGROUND OF THE INVENTION

Vehicles such as garbage and salt trucks, construction equipment, military tanks, and the like present various cleaning issues due to their intricate and odd shapes and large sizes. As a result, proper cleaning of such vehicles can be costly in terms of time, labor and water use.

Conventional wash systems may include cleaning apparatuses having brushes that physically contact the surface of a vehicle to remove dirt and debris therefrom. However, certain materials used in vehicles are susceptible to damage from the brush bristles or from the action of the brush bristles carrying dirt and other debris across the vehicle surface. More often, brushes may be impractical due to the unique shapes of certain vehicles. One solution to the impracticality of brush-based washing is to use high-pressure water spray nozzles to remove dirt, as opposed to using brushes. A typical brushless system has water spray nozzles or jets arrayed on a frame that spray the vehicle as the vehicle passes through the system However, water spray nozzles mounted in a fixed position in a wash apparatus may lose effectiveness in cleaning a vehicle because the distance between the fixed water spray nozzle and a vehicle surface varies with the size and shape of each different vehicle. Moreover, since these systems are non-vehicle specific, the systems use a great deal of water and may not reach all portions necessary to clean the vehicle and prevent corrosion.

One type of brushless system uses a number of nozzles that are all simultaneously activated, which requires multiple high-pressure pumps, adding significant cost to the system, to give adequate pressure to the nozzles for proper cleaning of the vehicle. Another type of system uses a gantry-type washing apparatus that is adapted to move linearly along the length of a vehicle. In this system, the entire line of nozzles moves together. With this system, the vehicle is stopped during cleaning, thus increasing the time necessary to clean the vehicle. Additionally, the nozzle arrangement does not allow for specific cleaning of various portions of the vehicle. The moving gantry and nozzles are a mechanical complication that requires additional parts and service, above that of a fixed nozzle system.

Since automated systems inadequately clean such vehicles, the only known adequate method involves manual cleaning. Manual cleaning, however, is time consuming and highly labor intensive.

In view of the above, it is an object of the present invention to provide a wash system to effectively wash large vehicles, while overcoming the disadvantages and drawbacks associated with the prior art.

BRIEF SUMMARY OF THE INVENTION

The present invention provides an improved wash system for cleaning large vehicles. The system includes a wash bay having a plurality of robotic wash monitors disposed therein. The plurality of robotic wash monitors are pivotable about two axes, namely a first axis and a second axis. Each robotic wash monitor also includes a nozzle for directing a stream of cleaning media against surfaces of a vehicle located in the wash bay. Associated with each robotic wash monitor is a measuring device that calculates the distance between the vehicle and the respective robotic wash monitor.

The system further includes a master control unit operatively connected to the robotic wash monitors and the measuring devices. The master control unit is operable to program the robotic wash monitors with a set of cleaning instructions for washing the vehicle. Specifical generates a cleaning routine for each robotic wash monitor based on three-dimensional (3D) data associated with the wash bay, 3D data associated with the vehicle, and the location of the vehicle within the wash bay.

In another aspect, the invention includes a method for washing a vehicle. In the method, three-dimensional (3D) data associated with a wash bay is received and stored. The wash bay may include a plurality of robotic wash monitors with each of the robotic wash monitors being pivotable about a first and second axes, and wherein each robotic wash monitor includes a nozzle pivotable therewith and operable to project a cleaning medium against surfaces of the vehicle. The method also includes receiving and storing data associated with the robotic wash monitors, the data being indicative of a location corresponding to each robotic wash monitor within the wash bay. Next, the method receives and stores 3D data associated with the vehicle. The distance between each nozzle of the robotic wash monitors and the vehicle, when the vehicle is located in the wash bay, is thereafter determined, as is an optimal cleaning procedure for the vehicle. Finally, cleaning medium is projected from the nozzles against the vehicle in accordance with the optimal cleaning procedure.

In another aspect, the invention includes a computer readable storage medium having stored therein instructions executable by a programmed processor for washing a vehicle, the storage medium comprising instructions for: receiving and storing three-dimensional (3D) data associated with a wash bay, the wash bay including a plurality of robotic wash monitors, each robotic wash monitor of the plurality of robotic wash monitors being pivotable about a first axis and a second axis, wherein each robotic wash monitor includes a nozzle pivotable therewith, each nozzle being operable to project a cleaning medium against surfaces of the vehicle; receiving and storing data associated with the plurality of robotic wash monitors, the data being indicative of a location corresponding to each robotic wash monitor; receiving and storing 3D data associated with the vehicle; measuring a distance between each nozzle of the robotic wash monitors and the vehicle when the vehicle is located in the wash bay; and programming the plurality of robotic wash monitors to clean the vehicle in accordance with an optimal cleaning procedure generated for each robotic wash monitor.

Further objects, features and advantages of the present invention will become apparent from consideration of the following description and the claims when taken in connection with the accompanying drawings.

BRIEF DESCRIPTION OF THE DRAWINGS

FIG. 3 is a flowchart detailing a method of washing vehicle in accordance with the present invention.

DETAILED DESCRIPTION OF THE INVENTION

Figure 1:
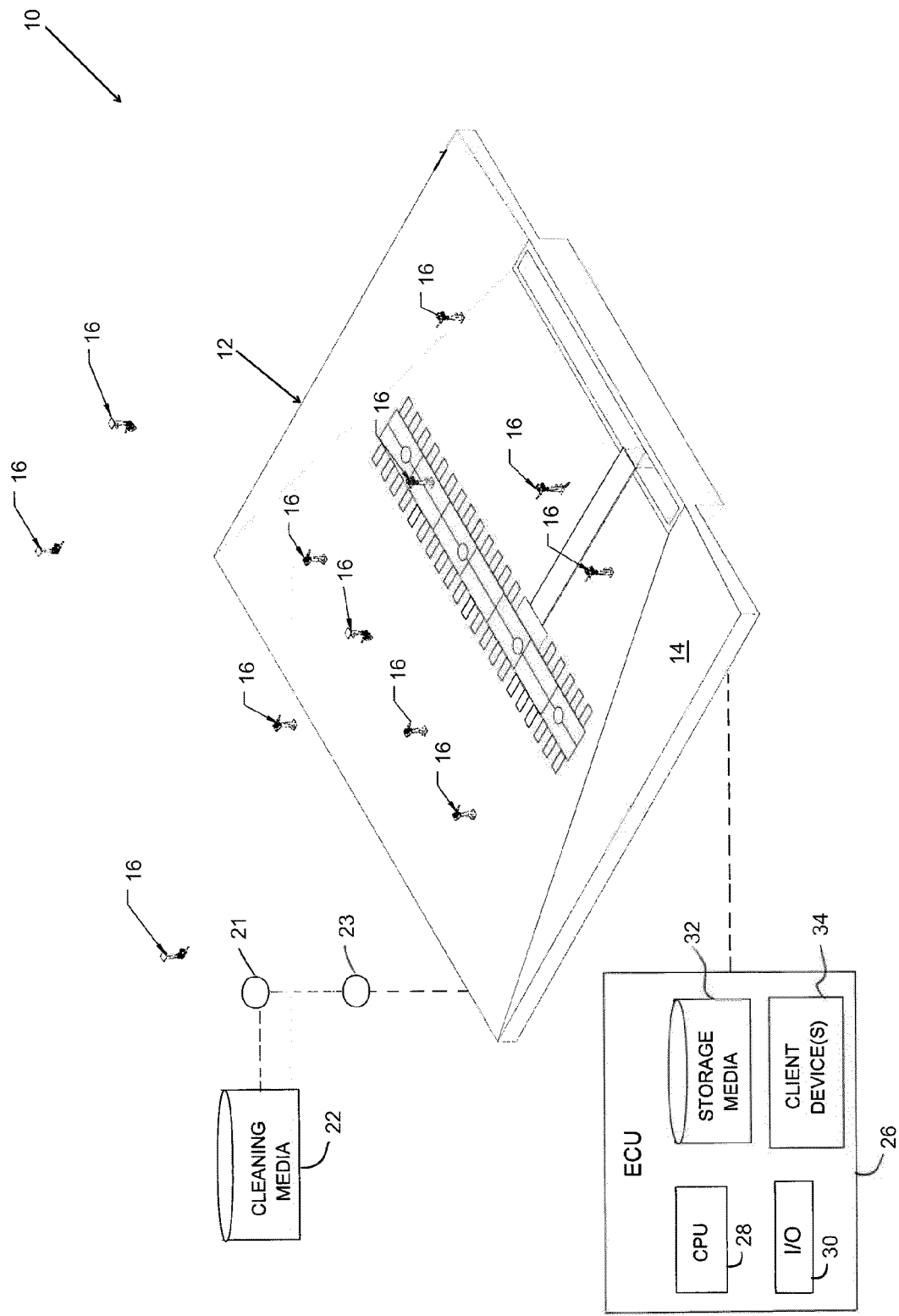
FIG. 1 is a perspective view of a vehicle wash system embodying the principles of the present invention.
Figure 2:
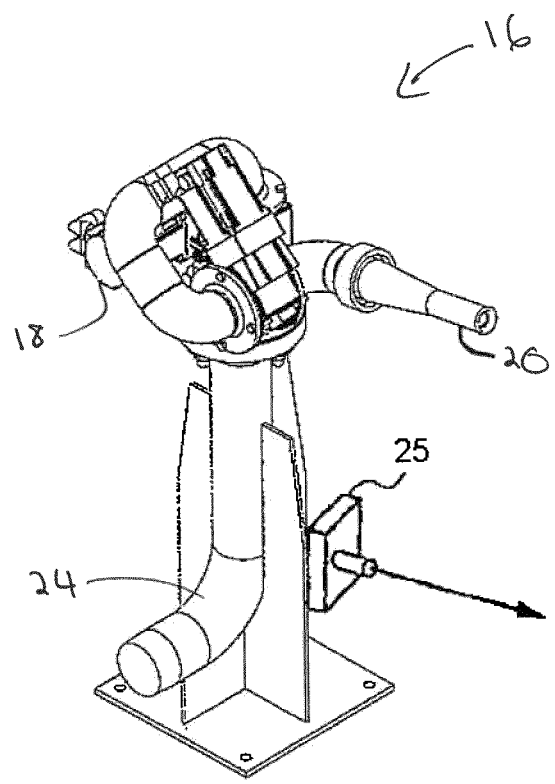
FIG. 2 is an enlarged view of an exemplary robotic wash monitor.

Referring now to FIG. 1, a vehicle wash system embodying the principles of the present application is illustrated therein and generally designated at 10. The system 10 comprises a wash bay 12 having a platform 14 for accommodating large vehicles. The wash bay 12 includes a plurality of spaced-apart robotic wash monitors 16 disposed at various locations therein. As best shown in FIG. 2, the robotic wash monitors 16 are operatively connected to motors 18 (e.g., electric, servo, etc.) that function to pivot the robotic wash monitors 16 about a first and second axis. While twelve robotic wash monitors 16 are shown in FIG. 1, it is to be understood that more or less robotic wash monitors 14 may be utilized.

Each robotic wash monitor 16 includes a nozzle 20 for projecting a jet of cleaning medium against surfaces of a vehicle located in the wash bay 12. The nozzles 20 are fluidly connected to a cleaning medium source, such as a water tank 22. Water from the water tank 22 is drawn out by a high-pressure pump 21 and supplied to the nozzles 20 by way of water flow conduits 24 connected therebetween. As is understood to those of ordinary skill in the art, the flow of high-pressure water may be regulated by a set of valves 23.

The wash bay 12 further includes a plurality of laser measuring devices 25, as illustrated in FIG. 2. While the laser measuring devices 25 are shown as being mounted to the robotic wash monitor 16, it is to be understood that the laser measuring devices 25 and the robotic wash monitors may be mounted separately. It is also to be understood that the laser measuring devices 25 may be disposed anywhere within the wash bay 12. As will be explained in greater detail below, the laser measuring devices 25 are configured to calculate the precise location of a vehicle parked in the wash bay 12.

The system 10 further comprises a master control unit 26 for controlling the robotic wash monitors 16, pumps, valves, laser measuring devices 25 and related devices. The master control unit 26 may include various components commonly employed in computing systems. For instance, the master control unit 26 may include a microprocessor having a central processing unit (CPU) 28, input/output circuits 30, storage media 32 such as such as memory (e.g., ROM, RAM, EPROM) or storage devices (e.g., disk drives, CDs, DVDs), etc. In addition, the master control unit 26 preferably includes at least one client device 34 having a graphical user interface (GUI) for enabling users to interact with the master control unit 26. Such client devices 34 may include general-purpose computers, laptops, personal digital assistants (PDAs), portable electronic devices, etc.

The master control unit 26 is configured to receive three-dimensional (3D) data associated with the wash bay 12 in order to generate a geometric representation of the wash bay 12. This may be accomplished using various techniques and algorithms known to those of ordinary skill in the art. For instance, the master control unit 26 may utilize a 3D modeling tool to generate a model of the wash bay 12 based on certain inputs regarding the shape and size of the wash bay 12. In addition, 3D data may be obtained from computer-aided design (CAD) drawings or a 3D data file corresponding to the wash bay 12. Moreover, three-dimensional scanning may be utilized to generate a 3D file corresponding to the wash bay 12.

The master control unit 26 is also configured to receive 3D data associated with vehicles in order to generate a geometric representation of the vehicle to be washed. It is to be understood that the master control unit 26 is not intended to be limited to a particular vehicle, and, as such, it may receive 3D data associated with a number of different vehicles. Analogous to the wash bay 12, the acquisition and loading of 3D data associated with a vehicle may be accomplished using any technique or algorithm known to those of ordinary skill in the art, including those mentioned above. In addition, the master control unit 12 may utilize manuals and/or specifications that may be available to generate a 3D model for a particular vehicle.

After 3D data for a vehicle is uploaded to the master control unit 26, a user may use a client device 34 to define certain areas of the vehicle as "exclusive." For instance, certain areas of the vehicle may be sensitive to high-pressure water and susceptible to damage. Such areas may be designated as "exclusive" so that the robotic wash monitors 26 are programmed to avoid these areas during the cleaning process. In contrast, areas of the vehicle that are generally dirtier and/or more difficult to clean than other areas of the vehicle may be designated as "dirty" or "hard to clean" so that the robotic wash monitors 26 are programmed to devote additional attention to these areas during the cleaning process.

Once the master control unit 26 receives 3D data associated with the wash bay 12 and 3D data associated with a vehicle, the data may be stored in the storage medium 32. The 3D data associated with the wash bay 12 preferably includes information regarding the precise location of each robotic wash monitor 16 disposed therein. If not, various techniques may be employed to ascertain the location of the robotic wash monitors 16, depending on the configuration of the wash bay 12.

According to one embodiment, the robotic wash monitors 16 are fixedly mounted to one or more of the ceiling, interior walls and platform 14 of the wash bay 12. Additionally, one or more robotic wash monitors 16 may be fixedly mounted to the platform 14 so as to effectively enable cleaning of the underbody of the vehicle. A user may enter the coordinates corresponding to the location of each robotic wash monitor 16 into the master control unit 16. Alternatively, the master control unit 26 may include software that utilizes the 3D data associated with the wash bay 12 in order to create a robotic wash monitor 16 setup that optimizes cleaning. That is, by using the dimensions of the wash bay 12, the master control unit 12 may determine specific coordinates for the robotic wash monitors 16 such that they may be installed in a manner that covers or creates a maximum cleaning area. Similarly, if the wash bay 12 is designed for a particular vehicle, the master control unit 12 may include software that uses the 3D data associated with the wash bay 12 and the vehicle in order to determine a configuration whereby the greatest percentage of the vehicle will be washed. In either case, the master control unit 12 stores the coordinates in a storage medium 32 after calculating the optimal coordinates for the positioning of the robotic wash monitors 16.

According to another embodiment, the robotic wash monitors 16 may be slidably or otherwise moveably disposed along the walls and/or platform 14 of the wash bay 12. As such, the master control unit 26 may include software that optimizes placement of the robotic wash monitors 16 for each vehicle being washed. In this embodiment, a plurality of sensors (not shown) may be provided in order to detect the location of the robotic wash monitors 16. Moreover, the wash bay 12 may include laser measuring devices 25 for calculating the specific location of a vehicle within the wash bay 12. Accordingly, initialization of a cleaning cycle may include determining a configuration that maximizes overall cleaning for a vehicle parked in the wash bay 12, based on the 3D data associated with the wash bay 12 and the vehicle, as well as the current location of the robotic wash monitors 16 and the vehicle. In turn, the master unit 26 may transmit a signal commanding the robotic wash monitors 16 to move to a position for optimal cleaning of the specific vehicle.

Once the master control unit 26 receives and stores 1) the 3D data associated with the wash bay 12, 2) the coordinates corresponding to the location of each robotic wash monitor 16, and 3) the 3D data associated with the vehicle to be washed, the master control unit 26 generates an optimal cleaning process. When a vehicle is parked in the wash bay 12, the master control unit 26 first determines the precise orientation and location of the vehicle based on the acquired or stored information from 1)-3) above, and measurements obtained by the laser measuring 25 devices relating to the location and orientation of the vehicle in the wash bay 12 (the master control unit 26 may temporarily cache these measurements in a local database). Based on the location and orientation of the vehicle, the master control unit 26 calculates polar coordinates for each robotic wash monitor 16, i.e., the master control 16 determines what surfaces of the vehicle each respective nozzle 20 can effectively spray and clean based on the distance and angle from each nozzle.

Regarding the orientation of the vehicle, there may be instances in which the 3D data associated with the vehicle does not accurately correspond to the vehicle parked in the wash bay 12 since many vehicles have moving parts (e.g., booms, lifting arms for buckets, etc.). As a result, the master control unit 26 may need to modify the stored 3D model of the vehicle in order to account for any variations resulting from the position of movable parts.

By way of example, a typical truck includes a moveable bed. Thus, the 3D model for the truck may not account for each possible position of the moveable bed. More particularly, the 3D data stored in the storage unit 32 may not correspond to the actual position of the bed of the truck. In this case, the laser measuring 25 devices may be employed to measure the angle or position of the bed. The master control unit 26 may then use this measurement and compare it to the stored 3D model in order to determine the actual position of the bed. In turn, the master control unit can align the bed in the 3D model accordingly, and it may save the new orientation for future use. Hence, the master control unit 26 may store various 3D models associated with a single vehicle to account for various orientations of the vehicle.

Using the foregoing information, the master control unit 26 calculates an optimal workload for each robotic wash monitor 16 and then allocates the workload thereto. By way of example, the master control unit 26 programs a particular robotic wash monitor 16 to clean certain areas of the vehicle if the master control unit 26 determines that it is the most optimally positioned robotic wash monitor 16 to do so. This is the workload for that particular robotic wash monitor 16. In allocating surfaces to the robotic wash monitors 16, the master control unit 26 will also take into account any areas of the vehicle that have been defined as "exclusive", "dirty" or otherwise. Additionally, the master control unit 26 may allocate the overall workload among the robotic wash monitors 16 evenly, e.g., such that the robotic wash monitors 16 each clean an equal percentage of the vehicle or project the same quantity of cleaning medium throughout the course of the cleaning cycle.

Finally, the master control unit 26 is operable to generate an optimal cleaning path or procedure for each of the robotic wash monitors 16 based on the workload. More particularly, the master control unit 26 choreographs the order that each robotic wash monitor 16 is to clean the surfaces allocated to it, and it determines how the robotic wash monitors 16 are to pivot about the first and second axes while spraying cleaning medium. In this regard, the master control unit 26 may take into account total cleaning time and quantity of cleaning medium required. Preferably, the master control unit 26 determines a setup whereby the robotic wash monitors 16 wash all, or substantially all, of the vehicle surfaces, in the shortest period of time, and using the least amount of cleaning medium necessary. Once the master control unit 26 calculates an optimal cleaning path for the robotic wash monitors 16, the coordinates corresponding to each cleaning path are stored in a storage medium 32. Execution of cleaning of the vehicle may now take place at any desired time (e.g., automatically, after a predetermined period of time, upon receiving a "start" command from a user, etc.).

After a vehicle has been washed, it may be determined that one or more surfaces of the vehicle need additional cleaning. For instance, there may be areas of the vehicle that were simply not within the range of the robotic wash monitors 16. In this case, a user may identify such areas on the 3D model shown on the GUI of a client device 34, and the master control unit 26 may determine where the vehicle needs to be re-located in order to reach these areas. Thus, a user may reposition the vehicle in the wash bay 12, as determined by the master control unit 26, so that the robotic wash monitors 16 can clean the areas identified as needing further cleaning.

Alternatively, there may be areas that were within the range of the robotic wash monitors 16, but were not sufficiently cleaned. In this case, a user may identify these areas on the GUI and remotely direct their cleaning by way of a mouse or other device associated with the client device 34. For instance, a user may "click" or otherwise select one or more areas and instruct the master control unit 26 to initiate a cleaning process for those particular areas. In turn, the master control unit 26 will determine which robotic wash monitor(s) 16 is(are) best suited to clean the necessary areas, and will generate cleaning paths for that robotic wash monitor 16. Furthermore, the user may designate these areas as "dirty" or "hard to clean" areas and the master control unit 26 may automatically account for such areas the next time that type of vehicle is cleaned using the system 10.

Referring now to FIG. 3, a method 100 of washing a vehicle using the system 10 of the present invention is detailed therein and begins at step 102. In step 104, the master control unit 26 determines whether data exists for the particular wash bay 12. Specifically, the master control unit 26 determines whether it has 3D data associated with the wash bay 12. If the data exists, the method proceeds to step 110. If not, the method continues with step 106 and uploads the 3D data to the master control unit 26. This may be accomplished according to any technique or algorithm known to those of ordinary skill in the art. In step 108, the 3D data associated with the wash bay 12 is saved and the method proceeds to step 110. In step 110, the master control unit 26 determines whether data regarding the location of the robotic wash monitors 16 within the wash bay 12 exits. If the 3D data regarding the location of the robotic wash monitors 16 exists, the method proceeds to step 112. If not, the data regarding the location of each robotic wash monitor 16 is obtained in step 114 and saved in step 116.

In step 112, the master control unit 26 determines whether 3D data associated with the vehicle parked in the wash bay 12 exists. If so, the method proceeds to step 118. If not, the method continues with step 115 and loads the 3D data to the master control unit 26. This may be accomplished according to any technique or algorithm known to those of ordinary skill in the art. Moreover, once the 3D data associated with the vehicle has been loaded, a user may define "exclusive" and "dirty" or "hard to reach" areas. In step 117, the master control unit 26 thereafter saves the 3D data associated with the vehicle, as well as any areas so defined by the user. The method thereafter proceeds to step 118.

Continuing with step 118, the master control unit 26 commences a process to generate a program to clean the vehicle. In step 120, the master control unit 26 determines how the vehicle is oriented and where the vehicle is located within the wash bay 12 based on the 3D information associated with the wash bay 12 and the vehicle, as well as measurements obtained from the laser measuring devices 25. In step 122, the master control unit 26 calculates polar coordinates for each robotic wash monitor 16 using the location and orientation of the vehicle calculated in step 120. In step 124, the master control unit 26 allocates an optimal workload for each robotic wash monitor 16 based on the polar coordinates calculated in step 122. In step 126, the master control unit 26 generates a cleaning procedure for each robotic wash monitor 16. The cleaning procedure is based on the workload and defines an optimal cleaning path, i.e., a set of movements for cleaning the vehicle surfaces efficiently and effectively. Once generated, the master control unit 26 saves the cleaning procedure in step 128 for the vehicle in question. In step 130, a cleaning cycle begins and the robotic wash monitors 16 clean the vehicle in accordance with the cleaning procedure. Once cleaning is completed, the method ends at step 132.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

While the above description constitutes the preferred embodiments of the present invention, it will be appreciated that the invention is susceptible to modification, variation and change without departing from the proper scope and fair meaning of the accompanying claims.

For instance, one or more robotic wash monitors 16 may include a second nozzle (not shown) for projecting a second cleaning medium such as a detergent. In addition, those of ordinary skill in the art will appreciate that the system 10 may include various components commonly incorporated with typical wash systems such as, but not limited to, chemical tanks, additional pumps, water heaters, a water softener, water collection and reclamation systems, etc.

The invention claimed is:

1. A robotic wash monitor system for washing a vehicle comprising:

a wash bay;

a plurality of robotic wash monitors disposed in the wash bay, the plurality of robotic wash monitors each including a nozzle operable to project a cleaning medium against surfaces of the vehicle, the wash monitors and nozzles being stationarily positioned along the wash bay and the nozzles being mounted on the wash monitors so as to only pivot about a first axis and a second axis;

a pump coupled to the nozzles and operable to provide high pressure cleaning medium thereto;

a plurality of valves in fluid communication with the nozzles and being configured to open and close the flow of cleaning medium from the pump to the nozzles;

at least one measuring device configured to measure the vehicle when the vehicle is located in the wash bay before washing of the vehicle; and a master control unit operatively connected to the plurality of robotic wash monitors, the pump, the plurality of valves, and the at least one measuring device, the master control unit being configured to calculate how the vehicle is oriented and where the vehicle is located in the wash bay based upon the measurements taken by the measuring device, and the master control unit being further configured to thereafter generate a cleaning procedure for each robotic wash monitor based upon the orientation of the vehicle and 3D data associated with the vehicle and to control the plurality of robotic wash monitors to clean the vehicle in accordance with the cleaning procedure, the cleaning procedure including the designating of areas of the vehicle as requiring additional washing and the designation of sensitive areas of the vehicle to avoid washing.

2. The system of claim 1, wherein the master control unit is operable to determine the orientation and location of the vehicle based on a set of inputs selected from the group consisting of: 3D data associated with the wash bay, data indicative of a location corresponding to each robotic wash monitor, and the distance between the nozzle of each robotic wash monitor and the vehicle.

3. The system of claim 2, wherein the master control unit is operable to calculate polar coordinates for each robotic wash monitor, the polar coordinates being based on the location and the orientation of the vehicle.

4. The system of claim 3, wherein the master control unit is operable to determine a workload for each robotic wash monitor, the workload being based on the polar coordinates.

5. The system of claim 4, wherein the workload for each robotic wash monitor is indicative of at least one vehicle surface to be washed by the corresponding robotic wash monitor.

6. The system of claim 5, wherein the optimal cleaning procedure generated for each robotic wash monitor is based on the corresponding workload.

7. The system of claim 6, wherein the optimal cleaning procedure defines a set of movements by the robotic wash monitor for cleaning the at least one vehicle surface to be washed.

8. The system of claim 1, wherein the master control unit is configured to calculate both the location and the orientation of the vehicle in the wash bay based on measurements taken by the at least one measuring device relating to the vehicle in the wash bay.

9. The system of claim 1, wherein the measuring devices are configured to conduct three-dimensional scanning of the vehicle in the wash bay.

10. The system of claim 1, wherein the measuring devices are configured to determine the precise location of the vehicle in the wash bay before washing of the vehicle.

* * * * *